(12) United States Patent
Castello

(10) Patent No.: US 7,958,933 B2
(45) Date of Patent: Jun. 14, 2011

(54) HEAT EXCHANGE UNITS

(75) Inventor: Marco Castello, Genoa (IT)

(73) Assignee: Ruths S.p.A., Genova (IT)

( * ) Notice: Subject to any disclaimer, the term of this patent is extended or adjusted under 35 U.S.C. 154(b) by 1488 days.

(21) Appl. No.: 10/529,347

(22) PCT Filed: Jun. 10, 2003

(86) PCT No.: PCT/IT03/00358
§ 371 (c)(1),
(2), (4) Date: Dec. 20, 2005

(87) PCT Pub. No.: WO2004/065873
PCT Pub. Date: Aug. 5, 2004

(65) Prior Publication Data
US 2006/0144562 A1    Jul. 6, 2006

(30) Foreign Application Priority Data

Jan. 17, 2003 (IT) .............................. MI2003A0070

(51) Int. Cl.
*F28F 9/007* (2006.01)
*F28G 7/00* (2006.01)
(52) U.S. Cl. .............. 165/74; 165/67; 165/84; 165/145; 165/157; 122/510
(58) Field of Classification Search .............. 165/67, 165/74, 84, 145, 157; 122/510
See application file for complete search history.

(56) References Cited

U.S. PATENT DOCUMENTS

| | | | | |
|---|---|---|---|---|
| 1,901,090 A | * | 3/1933 | Eule et al. ........................ | 165/67 |
| 2,069,515 A | * | 2/1937 | Armacost et al. ............... | 165/67 |
| 2,477,950 A | * | 8/1949 | Bailey .............................. | 165/67 |
| 2,869,518 A | * | 1/1959 | Seidl et al. ..................... | 122/510 |
| 2,894,494 A | | 7/1959 | Brooks et al. | |
| 3,172,739 A | * | 3/1965 | Koniewiez ..................... | 122/510 |
| 3,263,672 A | * | 8/1966 | Oechslin et al. .............. | 122/510 |
| 3,385,271 A | * | 5/1968 | Fleischer ........................ | 122/510 |
| 3,434,531 A | * | 3/1969 | Hochmuth et al. ............. | 165/67 |
| 3,581,813 A | * | 6/1971 | Bell .............................. | 165/157 |
| 3,896,873 A | | 7/1975 | Wolowodiuk et al. | |
| 4,113,007 A | * | 9/1978 | Flower et al. .................. | 122/510 |
| 5,219,150 A | | 6/1993 | Denysenko et al. | |

FOREIGN PATENT DOCUMENTS

| | | |
|---|---|---|
| FR | 1044642 | 11/1953 |
| GB | 722781 | 1/1955 |
| GB | 1099742 | 1/1968 |

OTHER PUBLICATIONS

International Search Report dated for International Application No. PCT/IT2003/000358.

* cited by examiner

*Primary Examiner* — Leonard R Leo
(74) *Attorney, Agent, or Firm* — Hogan Lovells US LLP

(57) ABSTRACT

A heat exchange unit, adapted to performing heat exchange between first and second fluids at different temperatures, comprises a heat exchange apparatus provided with a tube bundle, crossed internally by said first fluid, and containing means of the second fluid, adapted to receiving the exchange apparatus so that at least one portion of the tube bundle is externally surrounded by the second fluid. The exchange apparatus further comprises connection means which are structurally separate from said retainer means and to which one end of the tube bundle is operatively connected.

15 Claims, 10 Drawing Sheets

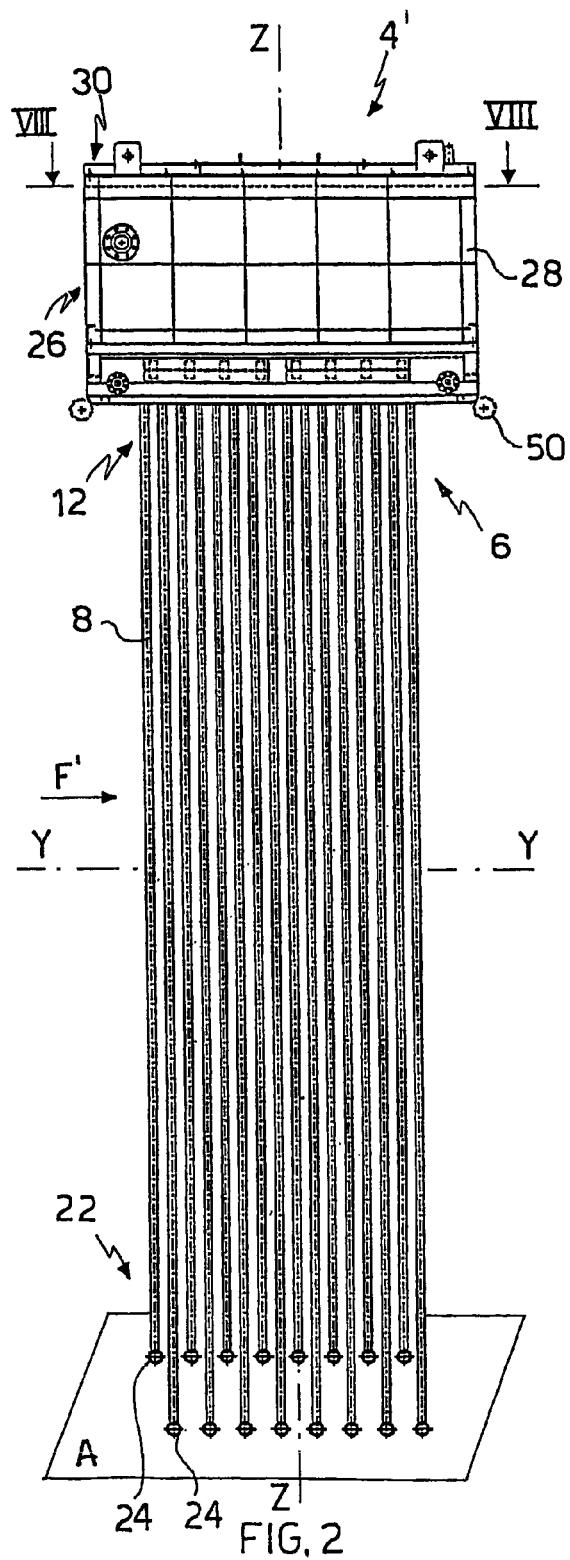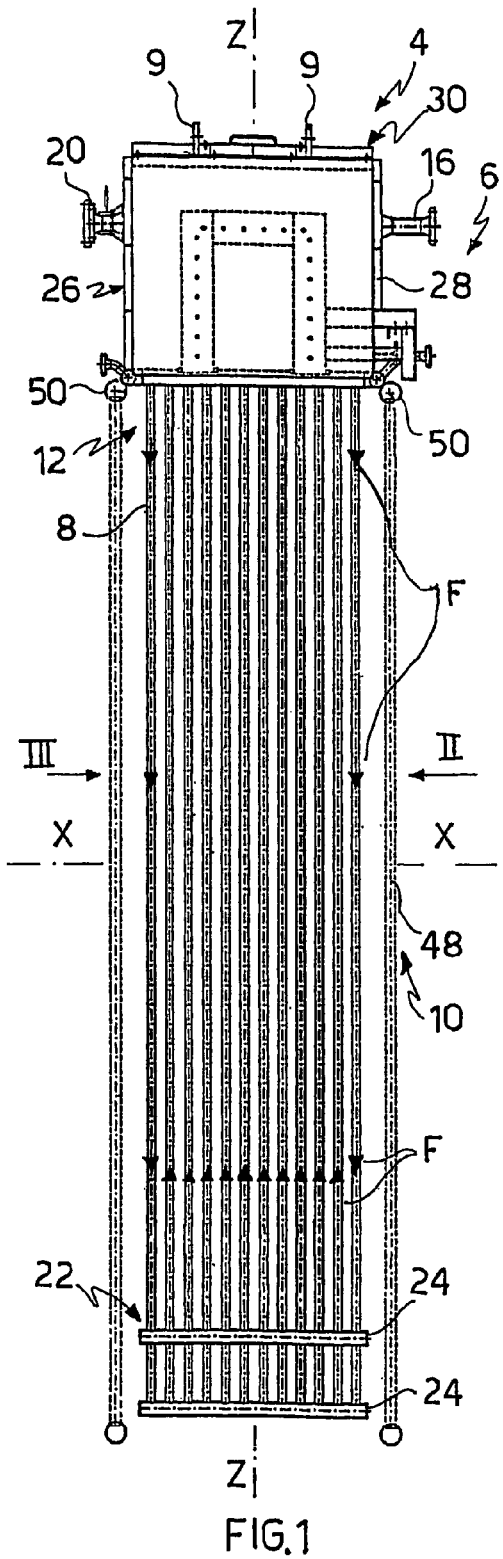
FIG. 2
FIG. 1

HEAT EXCHANGE UNITS

FIELD OF THE INVENTION

The present invention relates to a heat exchange unit suitable for performing heat exchange between at least two fluids at different temperatures.

BACKGROUND OF THE INVENTION

Said exchange units are typically used to exchange the energy possessed by a flow of warm gases, i.e. at a higher temperature, originating from an industrial process, to a cold fluid, i.e. at a lower temperature, circulating inside heat exchange elements that comprise the units.

In particular, gases originating from industrial combustion plants are frequently used as the flow of warm gases.

The coolant contained inside the elements of such systems is usually water or saturated or superheated water vapour, in a pressure range typically between 10 and 80 bar and a temperature range typically between 150° C. and 500° C.

The warm gases, on the other hand, have a temperature that usually varies between 100° C. and 1200° C. approximately and, given that they originate from industrial processes of combustion of urban/industrial waste, they contain ashes diffused within their mass, typically in a percentage that can vary between 0.5 $gr/Nm^3$ and 20 $gr/Nm^3$.

In heat exchange units it is known to provide a tube bundle, which is simultaneously crossed on the inside by a first liquid at a lower temperature, known as the coolant, and surrounded externally by a second fluid, at a higher temperature, typically a gas.

However, the ashes contained in the warm gases tend to soil the heat exchange surfaces of the heat exchange elements, i.e. the outer surfaces of the tubes of the tube bundle, thus hindering the heat exchange between the two fluids and irremediably compromising the performance of the units.

For this reason it is periodically necessary to shut down and clean the units, in order to recover optimal working conditions of the same.

Cleaning operations include cooling the unit, the replacement of the parts to be replaced by destructive cuts and the elimination of dust from the surface by means of mechanical abrasion or shaking.

The maintenance operations in any case require technical shutdown times in the order of several weeks, and considerably affect the plants' overhead costs, considering that such maintenance operations are performed with a frequency equal to approximately three times per year.

The need is felt for a heat exchange unit that permits efficient cleaning operations and that is then able to operate continuously for the longest possible period of time, thus reducing the times and frequency of maintenance operations.

The object of the present invention is to provide a heat exchange unit capable of solving the abovementioned state of the art drawbacks.

SUMMARY OF THE INVENTION

A heat exchange unit, adapted to performing heat exchange between first and second fluids at different temperatures, comprises a heat exchange apparatus provided with a tube bundle, crossed internally by said first fluid, and containing means of the second fluid, adapted to receiving the exchange apparatus so that at least one portion of the tube bundle is externally surrounded by the second fluid. The exchange apparatus further comprises connection means which are structurally separate from said retainer means and to which one end of the tube bundle is operatively connected.

BRIEF DESCRIPTION OF THE DRAWINGS

Further characteristics and the advantages of the heat exchange unit according to the present invention will result from the following description of a non limiting exemplary embodiment of this heat exchange unit, wherein:

FIG. 1 illustrates a front view of a heat exchange unit according to one embodiment of the present invention;

FIG. 2 illustrates a side view of the unit from FIG. 1 from the side of arrow II in FIG. 1;

DETAILED DESCRIPTION OF THE INVENTION

Figure 3:
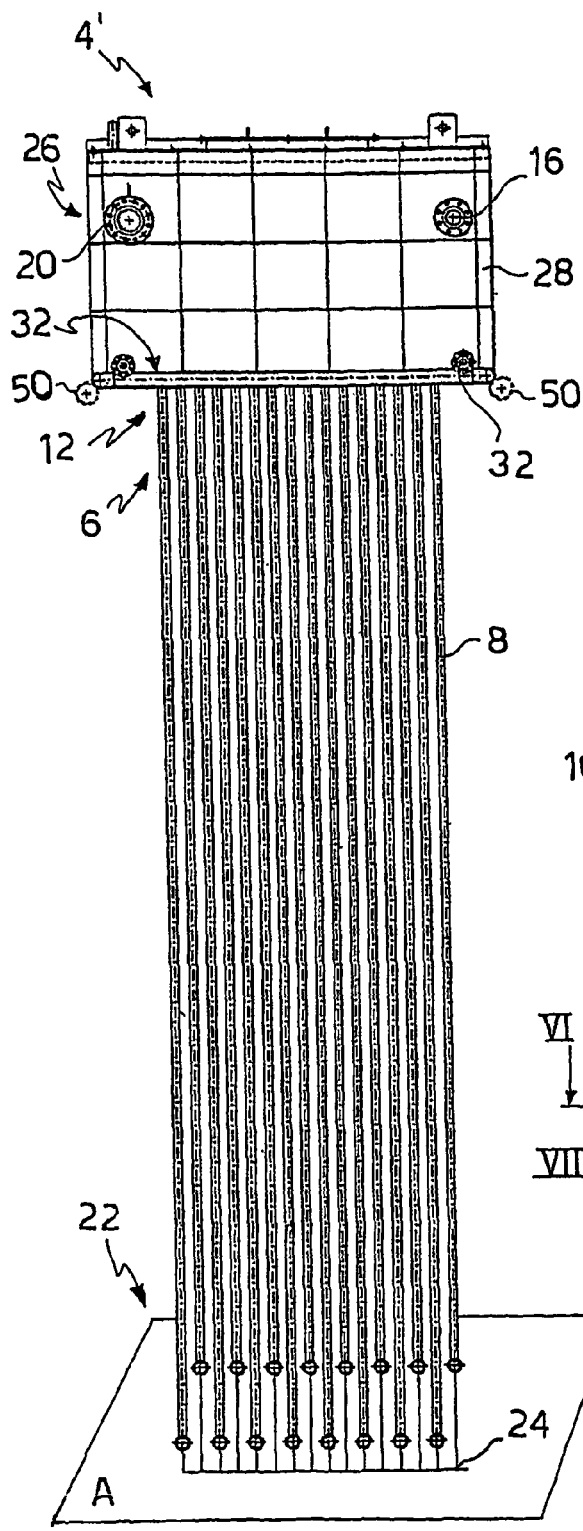
FIG. 3 illustrates a side view of the heat exchange unit from FIG. 1, from the side of arrow III in FIG. 1.
Figure 4:
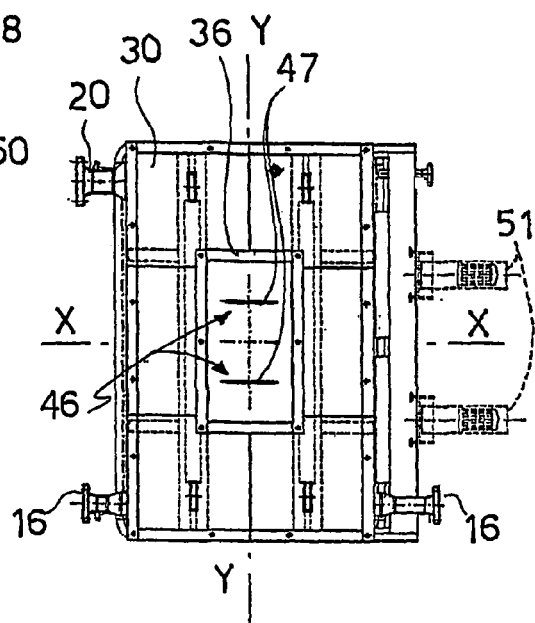
FIG. 4 illustrates a plan view of the heat exchange unit from FIG. 1.
Figure 5:
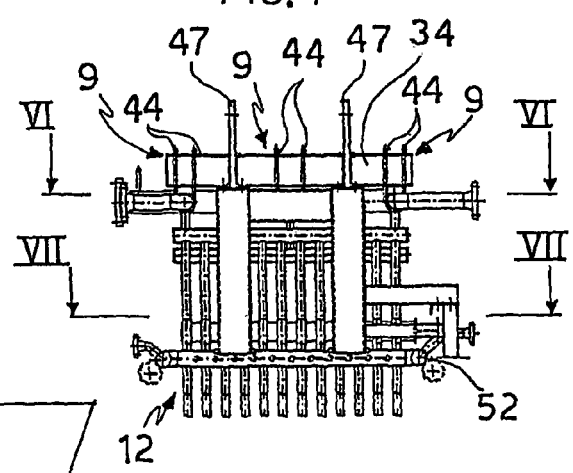
FIG. 5 illustrates a detail in partial section of FIG. 1.

With reference to the annexed figures 4',4",4''' globally refer to a heat exchange unit, which is suitable for performing heat exchange between first and second fluids at different temperatures.

In particular, 4' refers to a vaporiser heat exchange unit, as illustrated in FIGS. 1-11; 4" to a superheater heat exchange unit, as illustrated in FIGS. 12-21; 4''' to a economiser heat exchange unit, as illustrated in FIGS. 22-29.

The definitions of vaporiser, superheater and economiser heat exchange unit apply depending on whether the fluid that runs through the bundle of tubes is saturated steam, superheated steam or water, respectively.

The elements or parts of elements common to the various embodiments described below will be indicated using the same numerical references.

With reference to FIGS. 1-11 of the vaporiser heat exchange unit 4', the heat exchange unit comprises a heat exchange apparatus 6 provided with a tube bundle 8, suitable for being crossed internally by said first fluid, connecting means 9 for connecting the tube bundle 8 to the exchange apparatus 6, and containing means 10 for said second fluid which are suitable for receiving said exchange apparatus 6 in such a way that at least a portion of said tube bundle 8 is externally surrounded by said second fluid.

According to a possible embodiment, said tube bundle 8 preferably extends along a prevalent direction Z.

Preferably, said prevalent direction Z is substantially perpendicular to a base plane A on which the unit rests.

In the examples illustrated in the figures, the base plane A is horizontal and the prevalent direction Z is vertical.

In relation to a plane substantially perpendicular to the prevalent direction Z and therefore parallel to the base plane A, a direction X and a direction Y are observed, which are perpendicular to one another.

The tube bundle 8 comprises a plurality of tubes parallel to one another, which, according to a possible embodiment substantially extend in a vertical direction, i.e., perpendicular to said base plane A of the unit and parallel to said prevalent direction Z.

The tubes of the tube bundle 8 are suitable for being crossed internally by a first fluid such as water (economiser unit, FIGS. 22-29) or a saturated steam (vaporiser unit, FIGS. 1-11) or superheated steam (superheater unit, FIGS. 12-21), having an approximate temperature of, within normal ranges of use of heat exchange units, between 150° C. and 500° C. and a pressure of between 10 bar and 80 bar.

Said tubes are preferably made of metal materials, which are able to guarantee the mechanical and thermal resistance of the tubes to normal operating conditions, as well as an adequate heat exchange coefficient, without in any case requiring excessive thicknesses of the tube walls, in order to avoid unnecessarily weighing down the structure of the bundle.

Advantageously, at an upper end 12 of the tube bundle 8, i.e. an end of the bundle facing away from the base plane A of the exchange unit 4 along said prevalent direction Z, said exchange apparatus 6 comprises at least one distribution manifold 14, fluidically connected to said tube bundle 8. In a preferred embodiment, such as that shown in FIG. 6, said exchange apparatus 6 is provided with two distribution manifolds 14 which are structurally separate from one another, which extend in a linear way along said direction Y, at the ends of the tube bundle 8 which are opposite to said direction X.

Each of the distribution manifolds 14 comprises an inlet 16 designed to receive and direct the first fluid inside the manifold. In one embodiment each of said inlet 16 is connected by an angular joint to the corresponding distribution manifold 14, in such a way as to extend along said direction X, perpendicular to direction Y.

In other words the distribution manifolds 14 are located at opposite ends of the tube bundle along direction X, with the respective inlets 16 on the same side of the bundle relative to direction Y.

Each distribution manifold 14 is fluidically connected by a plurality of tubes of the tube bundle in such a way as to distribute a fluid in the same tubes through said inlets 16.

Figure 6:
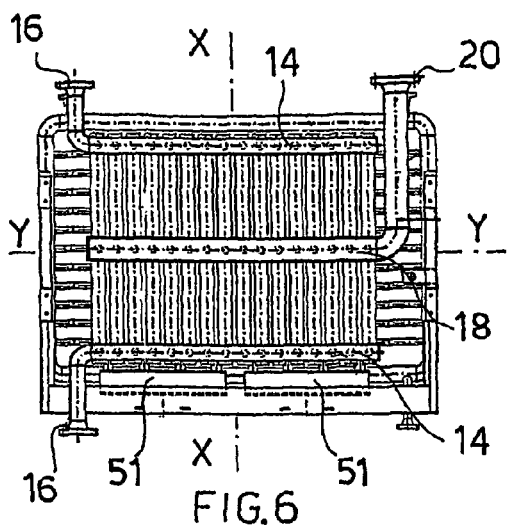
FIG. 6 illustrates a section of the unit from FIG. 5 taken along the line VI-VI of FIG. 5.
Figure 7:
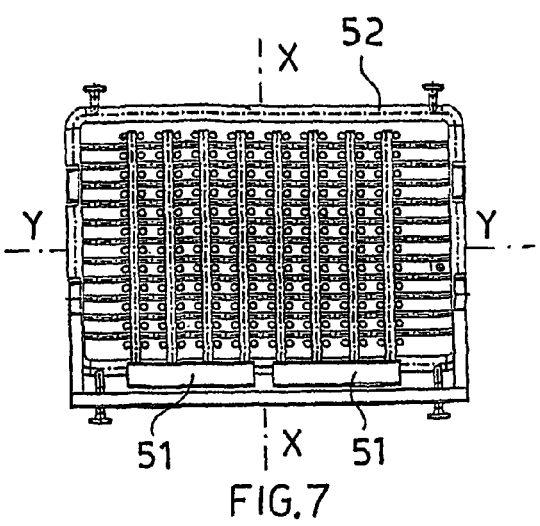
FIG. 7 illustrates a section of the unit from FIG. 5 taken along the line VII-VII of FIG. 5.
Figure 8:
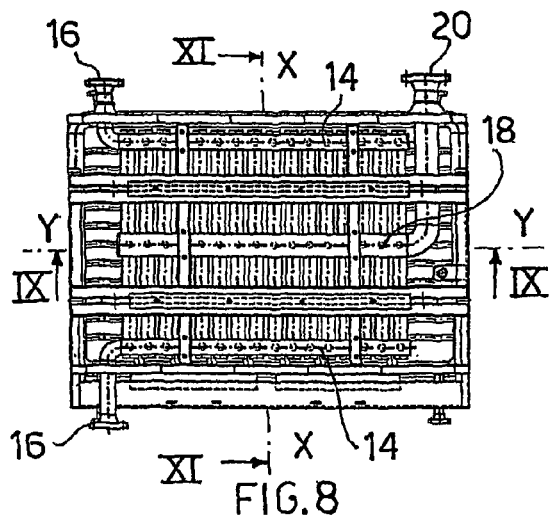
FIG. 8 illustrates a section of the unit from FIG. 2 along taken the line VIII-VIII of FIG. 2.
Figure 9:
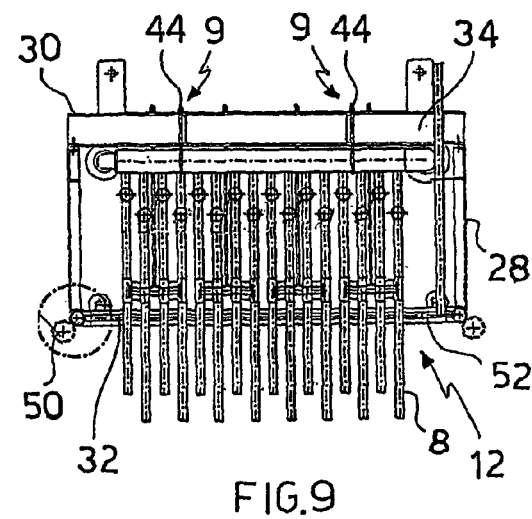
FIG. 9 illustrates a section of the unit from FIG. 8 taken along the line IX-IX of FIG. 8.
Figure 10:
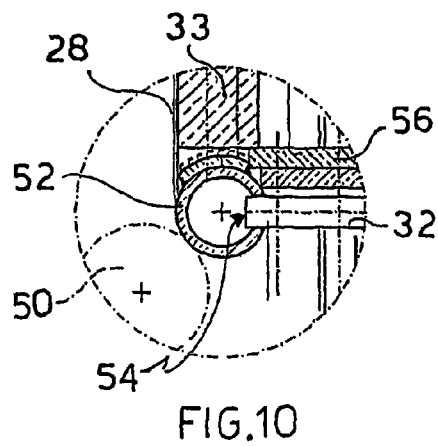
FIG. 10 illustrates an enlarged detail of the unit from FIG. 9.
Figure 11:
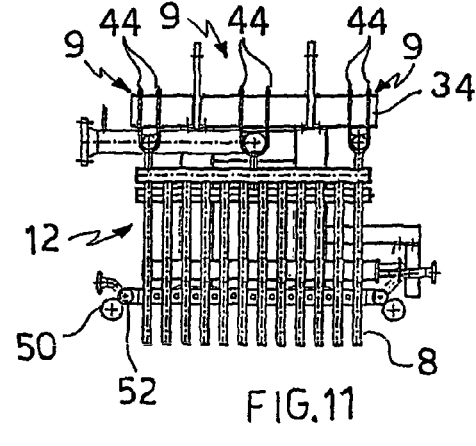
FIG. 11 illustrates a section of the unit from FIG. 8 taken along the line XI-XI of FIG. 8.
Figures 12, 13:
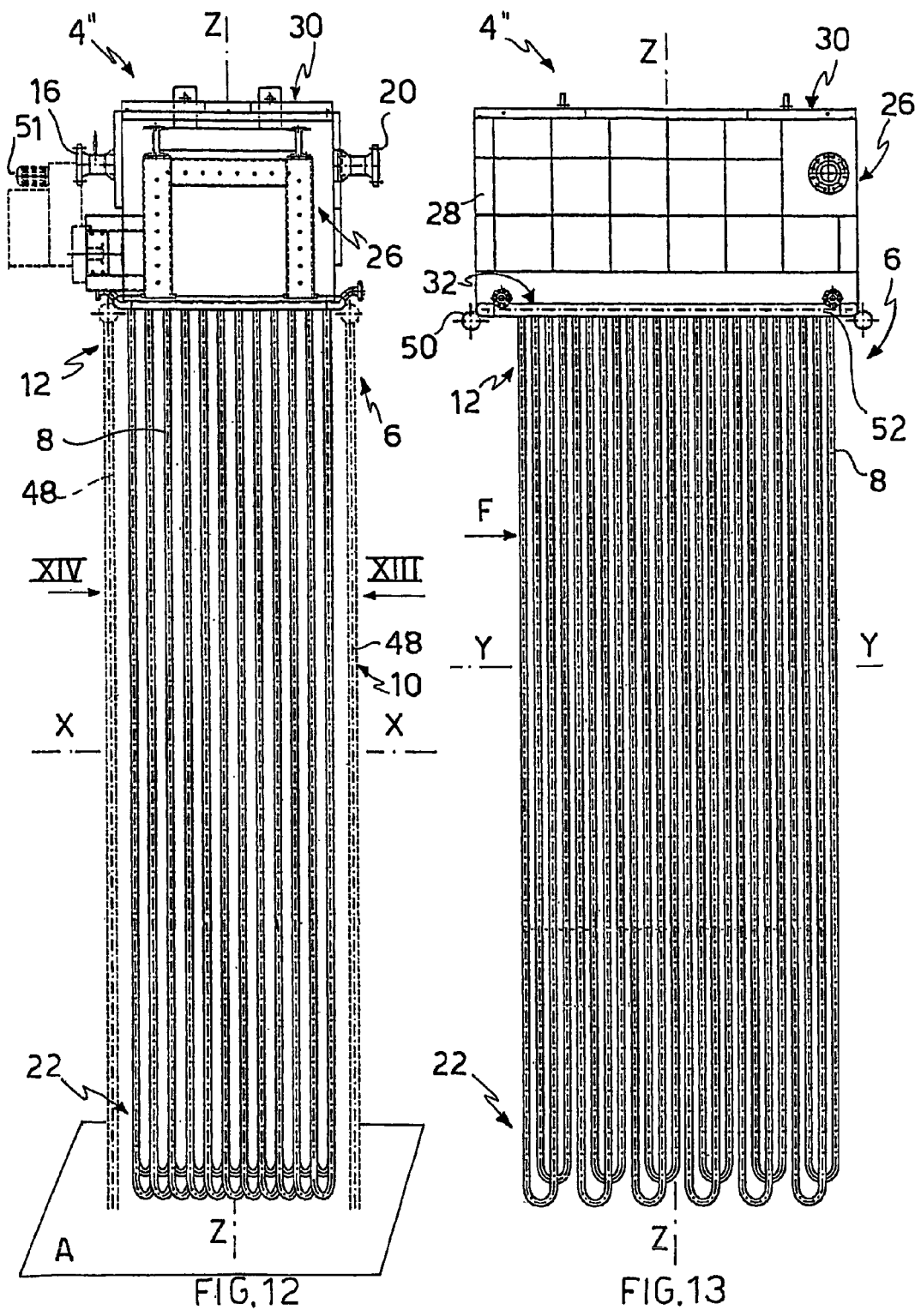
FIG. 12 illustrates a front view of a heat exchange unit according to a further embodiment of the present invention.
FIG. 13 illustrates a side view of the unit from FIG. 12 from the side of arrow XIII in FIG. 12.
Figure 14:
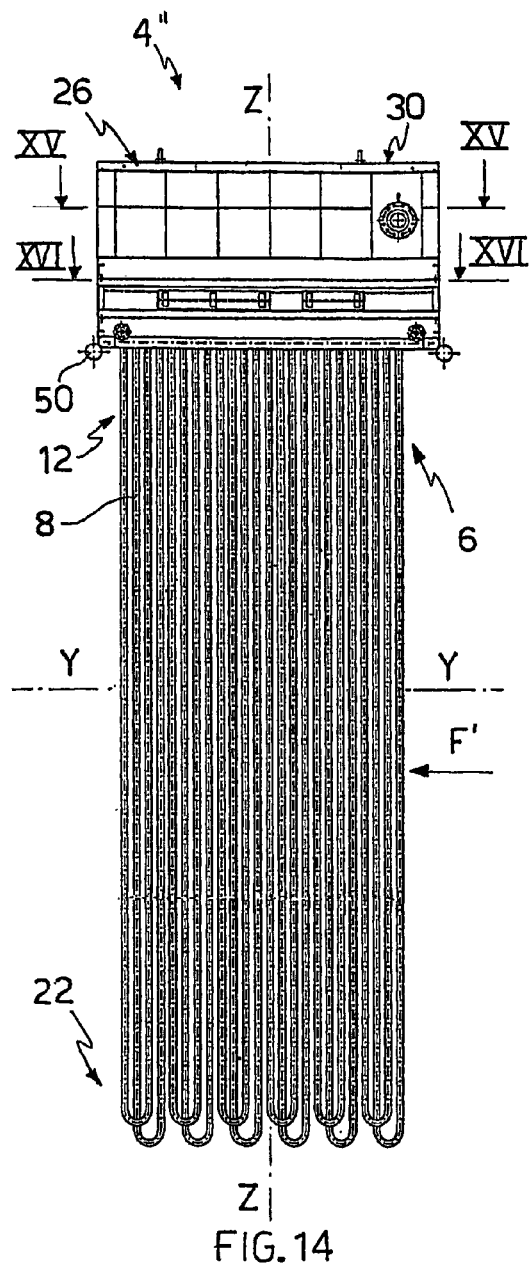
FIG. 14 illustrates a side view of the heat exchange unit from FIG. 12 from the side of arrow XIV in FIG. 12.
Figure 15:
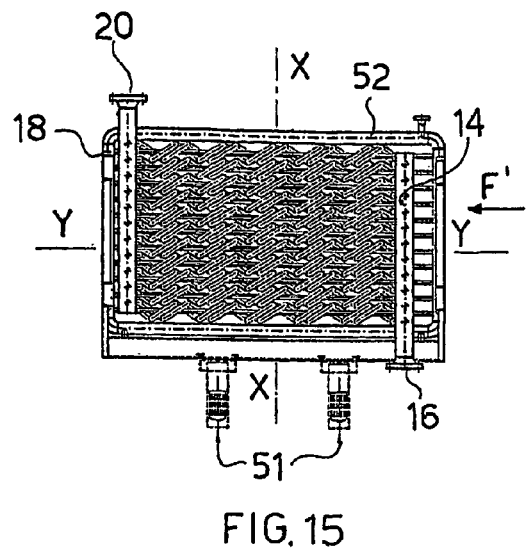
FIG. 15 illustrates a section of the unit from FIG. 14 taken along line XV-XV of FIG. 14.
Figure 16:
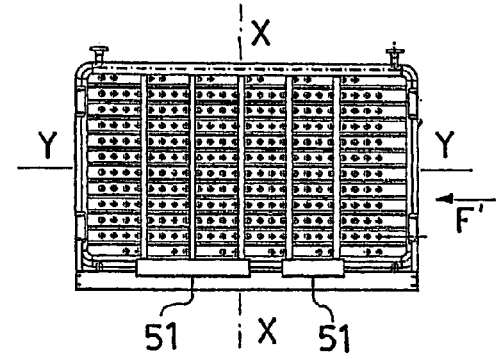
FIG. 16 illustrates a section of the unit from FIG. 14 taken along line XVI-XVI of FIG. 14.
Figure 17:
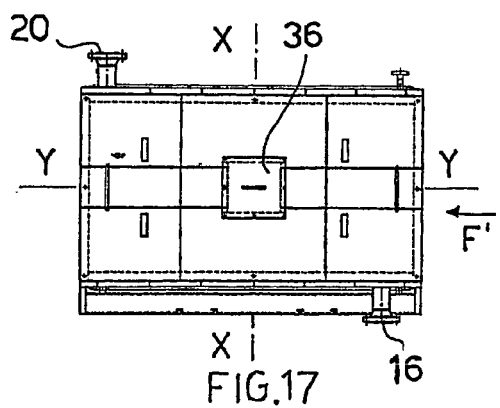
FIG. 17 illustrates a plan view of the heat exchange unit from FIG. 12.
Figure 18:
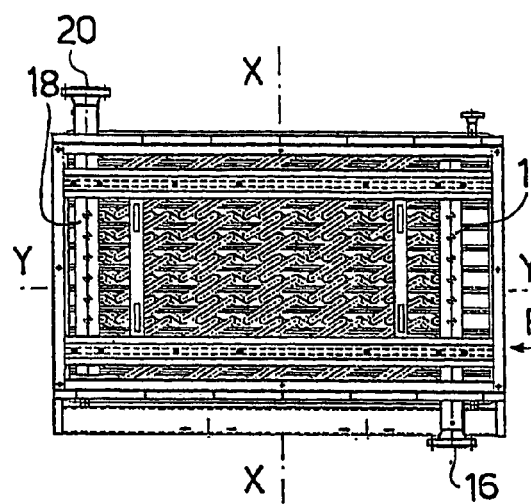
FIG. 18 illustrates a further plan view of the heat exchange unit from FIG. 12.
Figure 19:
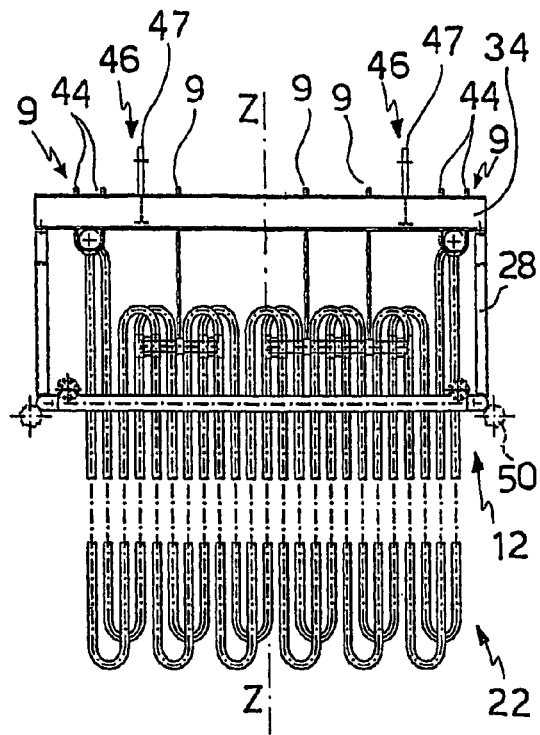
FIG. 19 illustrates a side view of the unit from FIG. 12.
Figure 20:
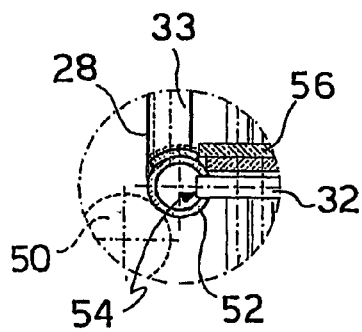
FIG. 20 illustrates an enlarged detail of the unit from FIG. 12.
Figure 21:
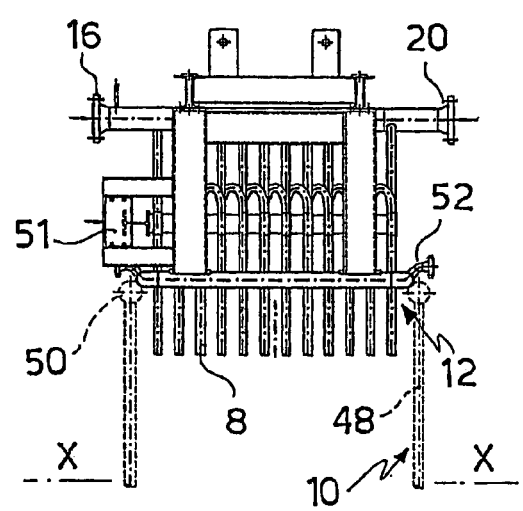
FIG. 21 illustrates a further side view of the unit from FIG. 12.
Figure 22:
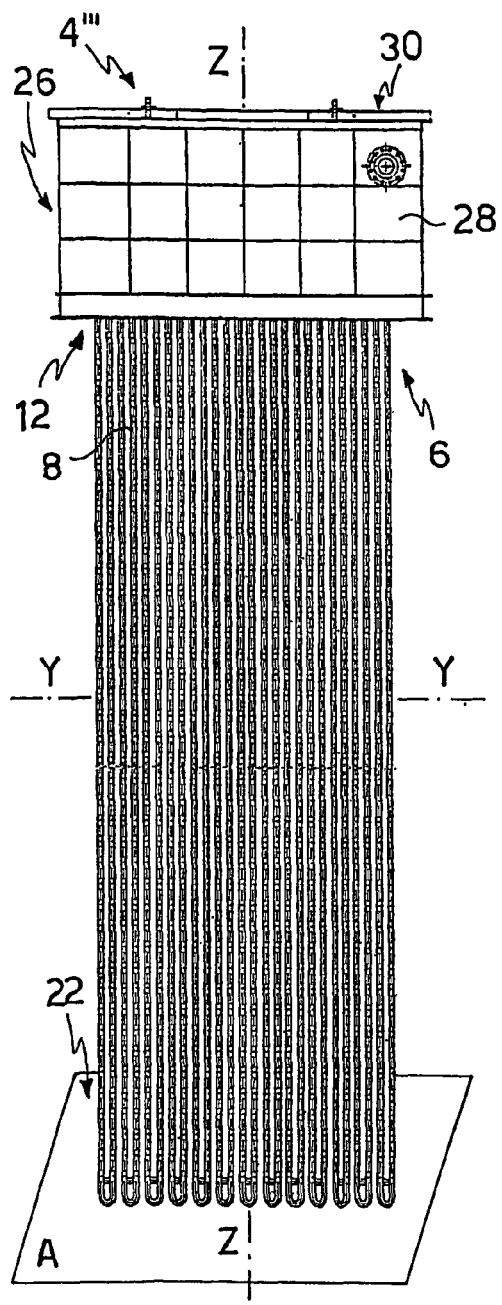
FIG. 22 illustrates a front view of a heat exchange unit according to a further embodiment of the invention.
Figure 23:
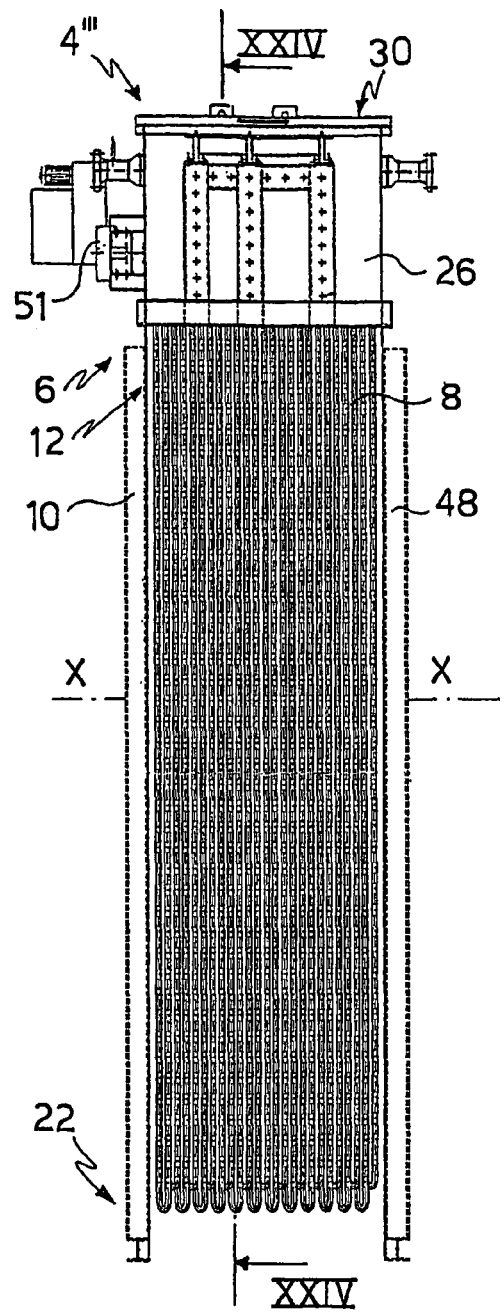
FIG. 23 illustrates a side view of the heat exchange unit from FIG. 22.
Figures 24, 25:
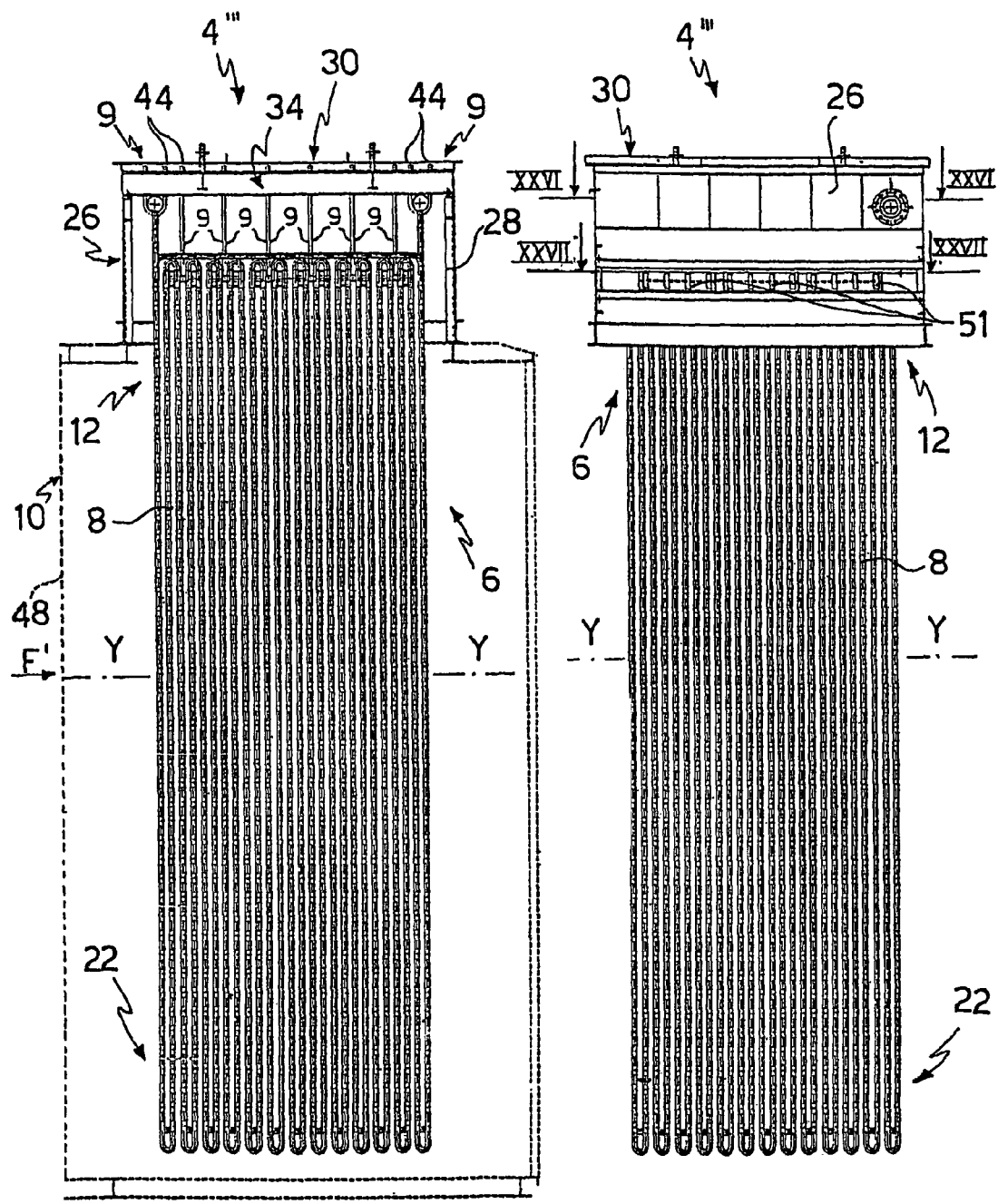
FIG. 24 illustrates a section of the unit from FIG. 23 taken along the line XXIV-XXIV of FIG. 23.
FIG. 25 illustrates a further side view of the heat exchange unit in FIG. 22.
Figure 26:
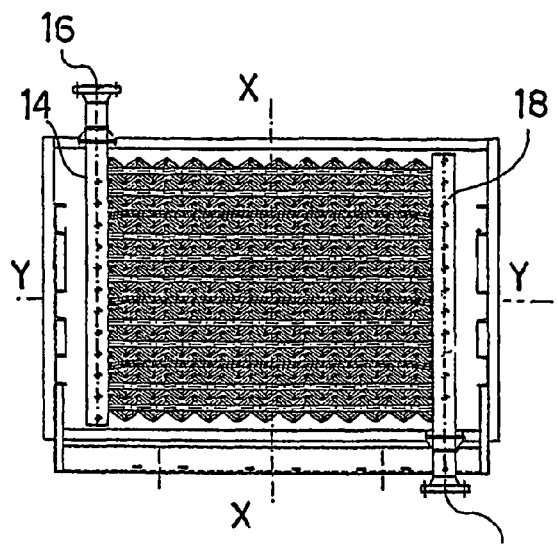
FIG. 26 illustrates a section of the unit from FIG. 25 taken along the line XXVI-XXVI in FIG. 25.
Figure 27:
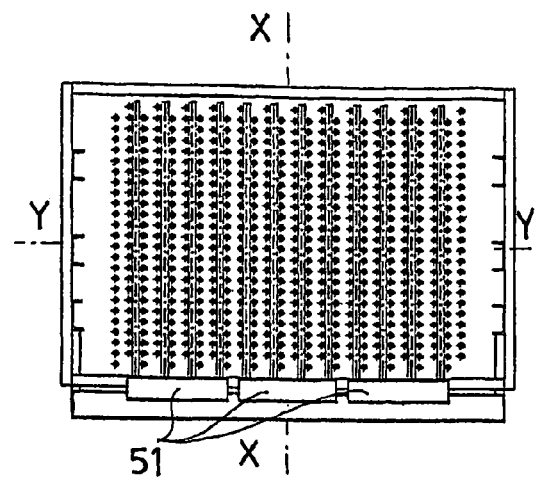
FIG. 27 illustrates a section of the unit from FIG. 25 taken along line XXVII-XXVII in FIG. 25.
Figure 28:
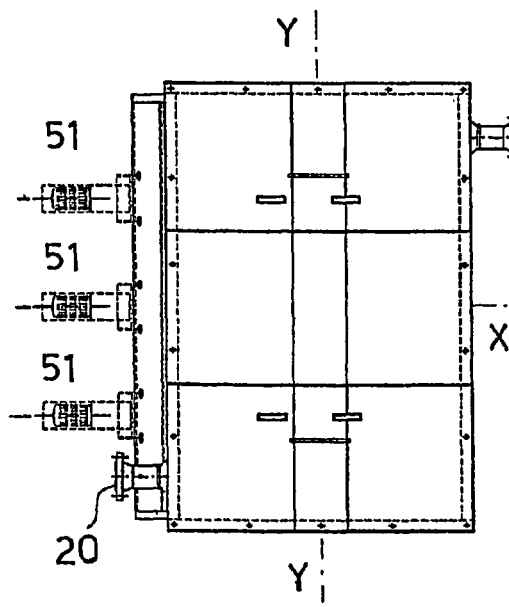
FIG. 28 illustrates a plan view of the unit from FIG. 22.
Figure 29:
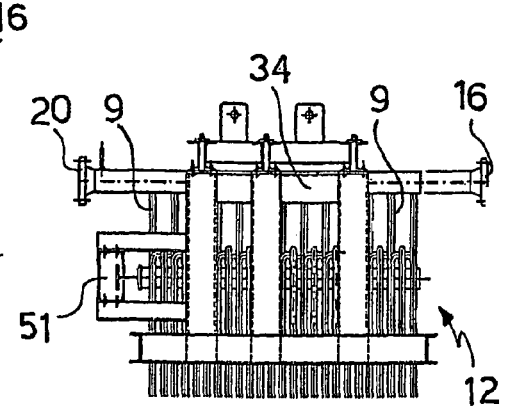
FIG. 29 illustrates a further front view of the unit from FIG. 22.
Figure 31:
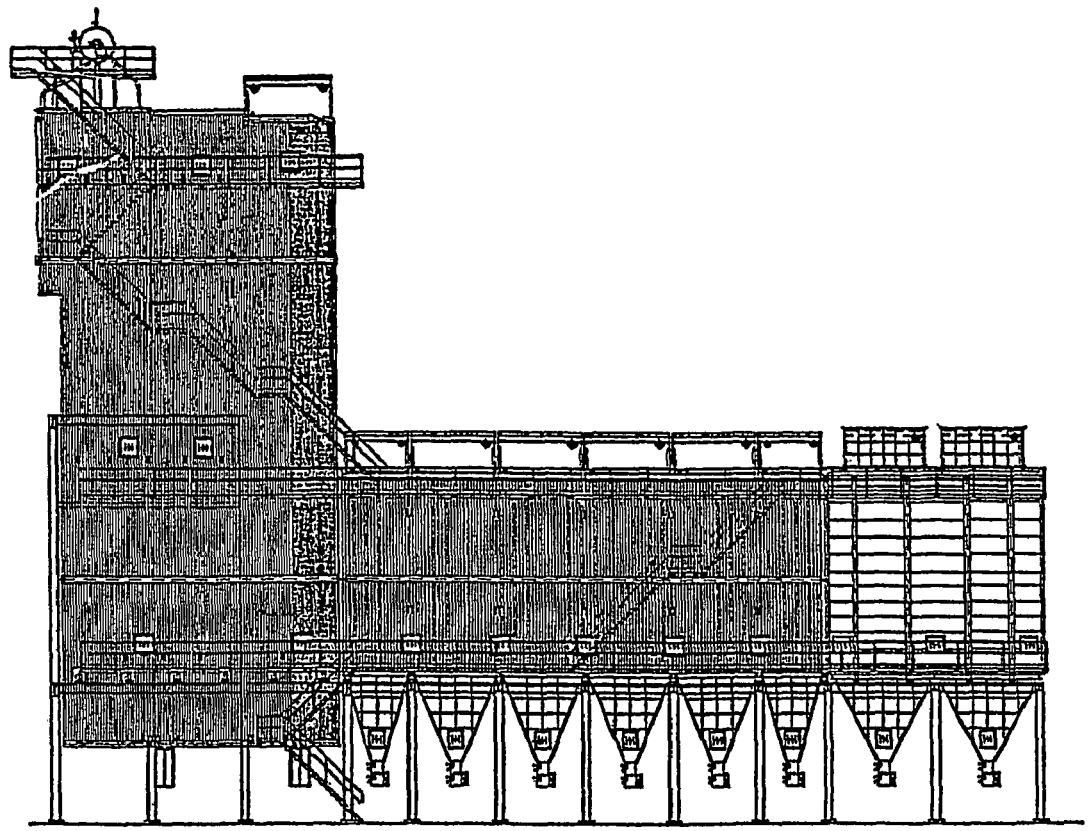
FIG. 31 illustrates a side view of the plant from FIG. 30 from the side of arrow XXXI in FIG. 30.
Figure 30:
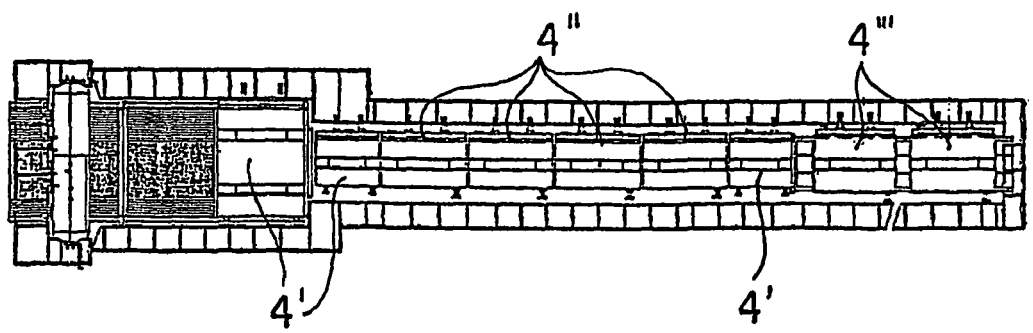
FIG. 30 illustrates a plan view of a steam production plant comprising heat exchange units according to the invention.

Advantageously, as shown in FIG. 6, in at the upper end 12, the heat exchange apparatus 6 comprises a collection manifold 18, suitable for directing a fluid flowing out of the tube bundle, through an outlet 20.

According to one possible embodiment, illustrated in FIGS. 1 and 2, said exchange apparatus 6, in at a lower end 22, facing the base plane A of the exchange unit 4 relative to prevalent direction Z, comprises at least one lower manifold 24, fluidically connected with the tubes of the tube bundle.

Preferably a plurality of lower manifolds 24 is provided. The lower manifolds 24, distribution manifolds 14 and collection manifolds 18 are connected to the tubes of the tube bundle, preferably by welding, thus guaranteeing fluidic connection.

Said manifolds 14,18,24 constitute a hydraulic circuit, in other words they are fluidically connected to one another and permit the circulation of the first heat exchange fluid therein, so that this fluid can enter the bundle through said inlets 16, circulate in the tube bundle following a predetermined path of the tubes, illustrated with arrows F in FIG. 1, and flow out of the bundle by at least outlet 20.

Advantageously, said at least one inlet 16 and said at least one outlet 20 are positioned on the same side of the tube bundle 8, i.e. at said upper end 12.

In other words, the inlets and outlets of the tube bundle are located at the upper end 12 of the bundle.

According to a further embodiment, illustrated for example in FIGS. 12-29, for both the superheater unit and the economiser unit, the tubes of the tube bundle extend as a coil along said prevalent direction Z.

In particular, the tubes extend prevalently in a direction parallel to prevalent direction Z and perpendicular to the base plane A of the unit, for example according to a vertical direction, from the upper end 12 to the lower end 22 of the tube bundle and vice versa.

The tubes include straight lengths, according to one embodiment, directed along the prevalent direction Z, connected to one another by curves or sines or circumference arches extending in a substantially perpendicular direction to said prevalent direction Z. In other words, the first fluid inside said coil, having travelled a straight length of tube in one direction, having reached one end of the bundle, then travels a curved stretch of tube and changes direction, i.e. it travels, in the opposite direction, a subsequent straight length of an adjacent tube, and so on.

According to one advantageous embodiment, each coil of said tube bundle, relative to a plane perpendicular to said prevalent direction Z and therefore substantially parallel to said base plane A, in turn extends along a curve that forms a series of alternatively protruding and re-entrant angles, or following a curve which forms a series of alternating concave and convex arches.

In other words, in relation to a direction parallel to said direction X or Y, each tube of the coil of the tube bundle is staggered in relation to the consecutive adjacent tube, so that each tube only partially overlaps the consecutive adjacent tube.

Advantageously by staggering consecutive adjacent tubes by a quantity not less than the diameter of the tubes themselves, it follows that in relation to a direction X or Y, two consecutive adjacent tubes do not overlap.

In reference to FIGS. 1-29 and therefore to the three possible embodiments explicitly illustrated, said tube bundle 8 is advantageously structurally connected to a collection tank 26 of the heat exchange apparatus 6.

Said collection tank 26 is located at the upper end 12 of the tube bundle 8 and, according to one possible embodiment, is made according to a substantially hollow, box-shaped structure, in such a way as to enclose and surround said upper end 12 of the heat exchange apparatus 6.

The collection tank 26 comprises a shell 28 which constitutes a lateral surface of the tank, a lid 30 and a base 32, which close the opposite ends of the shell.

Said lid 30 and said base 32 are fixed to the shell 28, in order to constitute a closed box-shaped structure and they extend substantially along planes parallel to the base plane A and perpendicular to the prevalent direction Z of the tube bundle.

According to one embodiment, the collection tank 26, at the inner surfaces of the shell 28, of the lid 30 and the base 32, i.e. the surfaces facing the inner enclosed volume of the tank, comprises insulation means and preferably insulating material panels 33, for example in ceramic material.

According to one possible embodiment, the lid 30 comprises at least one crosspiece 34 and an inspection hatch 36 for inspecting the exchange apparatus 6.

Said base 32 of the collection tank 26 is crossed by the tube bundle and therefore has the configuration of a drilled plate, i.e. it has holes with a diameter no smaller than the external diameter of the tubes of the tube bundle and such as to not allow the leakage of gas inside the tank.

Said crosspiece 34 is advantageously adapted to support the tube bundle 8.

According to one embodiment, the connection means 9 connect the upper end 12 of the tube bundle 8 to said crosspiece 34.

According to a preferred embodiment, said connection means 9 advantageously comprise hooks 44 adapted to provide a link at least in a vertical direction, i.e. parallel to said prevalent direction Z, for said tube bundle 8.

Advantageously said hooks 44 create a connection between said crosspiece 34 and the distribution manifolds 14 of the exchange apparatus.

Preferably said hooks 44 comprise a ring closed around said crosspiece 34.

According to a preferred embodiment said hooks 44 perform a connection between the crosspiece 34 and the distribution manifolds 14 of the tube bundle 8.

Therefore the tube bundle 8 is fixed to the heat exchange apparatus 6 exclusively at one extremity, i.e. with the exception of said end, the bundle is not fixed to any other structural element, i.e. the weight of the bundle itself rests entirely on the suspension systems which are present at an upper end 12 of the tube bundle 8.

In other words the tube bundle is bound at one end in such a way as to remain suspended, i.e. maintaining a substantially parallel direction to the prevalent direction Z.

According to further embodiments, it is possible to provide hooks in a number of parts welded together or connected by threaded connection means, it is possible to provide protruding elements in relation to said crosspiece and on which the tube bundles are hung.

Moreover it is possible to provide connection means that extend along a perpendicular direction to said prevalent direction Z, such as for example shelves protruding from the interior of said tank and to which said tube bundle is hung.

Advantageously inside said collection tank 26, the heat exchange unit 26 also comprises shaking means 51, better described below, adapted to shake the tube bundle 8 in order to perform cleaning operations on the same.

Advantageously the exchange apparatus 6 comprises hooking means 46, located at the end of the tube bundle 8 operatively connected to the connection means 9.

According to a preferred embodiment said hooks 46 comprise at least one eyebolt 47, adapted to perform a hooking with suitable hoisting instruments, in order to consent the handling of the tube bundle 8.

The heat exchange unit 4 comprises the containing means 10 suitable for receiving the exchange means 6 therein so that at least one portion of the tube bundle 8 is externally surrounded by the second fluid.

Said containing means 10 preferably extend along the prevalent direction Z of the tube bundle 8 so as to surround and enclose the bundle itself.

Said heat exchange apparatus 6 is advantageously rested on said containing means 10. By the term rested it is intended that the exchange means 6 rests on a portion of the containing means weighing it down with its weight, and is therefore supported by the same, without further links.

According to one possible embodiment, in order to guarantee a fluid seal between exchange means 6 and the containing means 10 so that the gases do not leak into the environment outside the exchange unit 4, advantageously, at an interface between the exchange apparatus 6 and the containing means 10, a frame 52, which is preferably part of the tank 26, is interposed.

According to a preferred embodiment, said frame 52 perimetrally surrounds the base 32 of the collection tank 26.

Preferably, the frame 52 has a 'C'-shaped section, so that the distance between the two ends of the 'C' is not less than a height of an outer edge 54 of the base 32 taken along a direction parallel to the prevalent direction Z.

Advantageously said frame is suitable to being fitted around the outer edge 54 of the base 32, in other words, a shape coupling is provided between the C-shaped section and the outer edge of the base 32.

According to one possible embodiment, an insulating plate 56, preferably in ceramic material, is placed over said base 32 in order to rest on said base 32 inside the collection tank 26.

Said exchange apparatus 6 is at least partly received in the containing means 10.

Advantageously, the containing means 10 comprise a casing 48 that surrounds the tube bundle and that performs conveyance of the fumes towards the tube bundle 8, according to a direction substantially perpendicular to the prevalent direction Z of the tube bundle 8, for example indicated by the arrow F' in FIG. 2.

Advantageously said casing 48 terminates at one end with a collar 50 extending along the perimeter of the end of the casing.

Preferably said collar 50 extends along a perimeter that follows and partially contains the outer edge 54 of the base of the collection tank.

Due to the fact that the outer edge 54 of the base 32 is at least partially comprised inside the area delimited by the collar 50, a link is made in the prevalent direction Z between the exchange apparatus and the containing means.

In other words, the exchange apparatus 6 is rested on the collar 50 of the containing means 10.

According to one embodiment, advantageously, seals (not illustrated), preferably in ceramic fibre, are interposed between the collar 50 and the base 32 in order to guarantee a fluid seal.

According to a further embodiment the collar 50 receives the frame 52 of the base 32 in tight stroke.

According to one embodiment, advantageously, said frame 52 can be cooled, by creating a hydraulic pipeline inside it and connecting said pipeline to a cooling circuit.

According to one possible embodiment, advantageously, said exchange apparatus 6 also comprises a tube bundle cleaning system.

Preferably said cleaning system is a shaking system, which cleans the surfaces of the tubes of the tube bundles by means of direct or indirect percussion of the tube bundle itself.

Advantageously said cleaning system is mounted near said upper end 12 of the tube bundle 8, preferably inside said collection tank 26, if provided.

In particular, by positioning the cleaning system inside the collection tank, in an area not surrounded by hot or corrosive combustion gases, the duration and reliability of the system are prolonged.

Advantageously the cleaning system comprises some bars which are welded or in any case made integral to the elements of the tube bundle.

Moreover said bars are made integral or connected to one another. A battery of shakers is adapted to shake said bars in order to make the tube bundle elements vibrate.

The heat exchange units described are used in any type of total or partial recovery plant, in other words they are heat exchange apparatus or heat exchangers or heat transformers, adapted to use the residual thermal content of a fluid that is unloaded from any type of plant.

Advantageously they are used in waste incineration plants, in which the fumes produced by the incinerator constitute the 'hot' fluid, in other words the second fluid having a residual thermal content which is intended to be recovered, by transferring it to the first fluid at a lower temperature, known as the coolant.

The combusted gases originating from the incineration of the waste are rich in toxic or polluting powders and therefore, in order to be released into the atmosphere they must be purified.

Normally purifying filters are unable to filter such high temperature gases, as at such temperatures, the toxic substances contained in the gases are extremely corrosive to the extent that they rapidly deteriorate the filters.

In this type of plants, the units described are particularly advantageous.

In actual fact in such incineration plants the fumes produced following waste incineration are directed along a predetermined fume route, through the containing means, for example with suitably insulated channelling systems in order to limit heat loss.

Advantageously, the heat exchange units disclosed in the present invention are arranged along said path.

Preferably, the direction systems develop in a horizontal direction, i.e. parallel to the base plane or basement of the plant, whilst the exchange units develop according to a vertical direction, i.e. perpendicular to the direction horizontal to the base plane of the plant.

Such units therefore consent heat exchange between the combustion fumes and a coolant that flows, under natural or artificial circulation, inside tube bundles.

Advantageously the first fluid or coolant used is constituted by water in various physical states, and in particular under the form of saturated steam, heated steam or water, depending on whether they are vaporiser units 4', superheater units 4" or economiser units 4'''.

The first fluid that circulates inside the tube bundle, following heat exchange increases in temperature and can therefore be directed towards a wide range of uses, for example as motor fluid in steam turbine plants or in order to supply a heating unit.

It will be appreciated in the above description, that the heat exchange units according to the invention make it possible to overcome the drawbacks encountered in state of the art exchange units.

Unusually the heat exchange units described can be extracted with very simple operations and the extraction operation does not require any destructive cutting of metal sheet and pressurised parts in general, but merely the removal of threaded connections on the flanging connecting the unit with the heat exchange fluids.

The fact that no destructive cuts are performed entails further economic advantages, as well as a considerable reduction in technical plant shutdown times, as the welded or replaced pressurised parts must be subject to new checks and testing.

A further advantage relates to cleaning operations, as it is possible to use state of the art shaking systems with a technical effect which is unobtainable in the heat exchange units of the previous type.

In actual fact in the known exchange units the tube bundle is linked to the structure of the unit in a rigid manner, whereby, if subject to hammering, the bundle tubes vibrate slightly and the amount of removed dust is very poor. It should also be considered that dusts often contain residues that make them sticky or viscous and the same therefore almost tend to stick to the outer surfaces of the bundle tubes. The hammering action must therefore be energetic and cause ample tube oscillations, in order to consent adequate cleaning.

The disclosed tube bundle, thanks to the linking systems described, has a considerable elasticity in operation, without requiring disconnection from the exchange unit.

At the same time, in order to guarantee elasticity to the tube bundle, thus preventing it from becoming excessively deformed by the thermal strain caused by the contact with warm gases, particularly advantageous is the arrangement of the tubes, which, in relation to a plane perpendicular to the preferential direction of the bundle, run according to a curve that forms alternating protruding and receding angles.

This configuration, though guaranteeing high flexibility to the tube bundle and therefore an efficient and rapid cleaning of the same by means of shaking systems, is able to guarantee correct relative positioning between the bundle tubes whilst the exchange unit is in operation, in order not to hamper correct heat exchange between the tubes and outer fluid.

In actual fact if the bundle tubes are excessively frail, a danger exists that under thermal strain the tubes may become excessively deformed and lose their correct alignment in relation to the flow of warm gases, with the consequential reduction in the heat exchange surface between the fluids.

Therefore, the tube bundle described guarantees high unit efficiency in all operating conditions, and consents rapid and accurate removal of the dust covering it, thus guaranteeing maximum cleaning efficiency.

The positioning of the shaker system in an area not surrounded by warm and corrosive gases, allows greater duration of the shaker systems themselves.

A further advantage is that the connection means between the tube bundle and the heat exchange unit do not come into contact with the flow of warm, corrosive gases. Therefore on the one hand such connection means are not subject to any corrosive action that may compromise their duration, and on the other they do not in turn constitute a receptacle for dust, which, as in state of the art units, inevitably tends to fall onto the tubes, thus contributing to the soiling of the bundle.

Obviously, those of ordinary skill in the art, in order to satisfy contingent and specific requirements, can bring about a number of alterations and variants to the heat exchange units described above.

For example, a tube bundle may be provided which is hung on the structure of the heat exchange unit also in an embodiment that does not provide for the use of the collection tank.

Moreover the tube bundle can be linked to the exchange unit even without separation means between the area surrounded by the warm fumes and the area in which the shaking means are located.

Obviously further alterations and variants are possible to the heat exchange units described, all of which remain within the scope of the invention as defined in the following claims.

I claim:

1. A heat exchange unit, suitable for performing heat exchange between first and second fluids at different temperatures, comprising an exchange apparatus provided with a tube bundle, crossed internally by said first fluid, containing means of said second fluid, suitable for housing said exchange apparatus in such a way that at least one portion of said tube bundle is externally surrounded by said second fluid;
   wherein said exchange apparatus comprises a connection means structurally separate from said containing means and to which one end of said tube bundle is operatively connected;
   a collection tank arranged at the end of the tube bundle operatively connected to the connection means;
   and a separating means interposed between said collection tank of the tube bundle and said containing means suited to guaranteeing a fluid seal between said collection tank and said containing means;
   wherein said collection tank comprises a box-shaped structure that is fluid tight relative to said second fluid and said collection tank encloses said connection means;
   wherein said separating means comprises a separation frame, solidly fixed to the collection tank;
   and wherein the exchange apparatus rests on a portion of said containing means weighing it down with its weight and wherein the exchange apparatus is supported by the containing means without further links.

2. The heat exchange unit according to claim 1, wherein said connection means extend in a direction that is substantially parallel to said tube bundle.

3. The heat exchange unit according to claim 1, wherein said connection means extend in a direction that is substantially perpendicular to said tube bundle.

4. The heat exchange unit according to claim 1, wherein said tube bundle comprises at least one inlet opening of the first fluid into the tube bundle and at least one outlet opening of the first fluid from the tube bundle, said inlet opening and said outlet opening being arranged in correspondence with said connection means.

5. The heat exchange unit according to claim 1, wherein said heat exchange apparatus comprises shaking means of said tube bundle.

6. The heat exchange unit according to claim 1, wherein said heat exchange apparatus rests on said containing means.

7. The heat exchange unit according to claim 1, wherein said separating means comprise a separating plate at least partially crossed by said tube bundle.

8. The heat exchange unit according to claim 7, wherein said separation plate is solidly fixed to said collection tank.

9. The heat exchange unit according to claim 1, wherein said separation frame is integrally fixed to said collection tank.

10. The heat exchange unit according to claim 1, wherein said separation frame is adapted to being connected to a cooling circuit.

11. The heat exchange unit according to claim 1, wherein said exchange apparatus comprises hooking means, adapted to allowing the handling of said exchange apparatus, said hooking means being arranged at the end of the tube bundle operatively connected to the connection means.

12. The heat exchange unit according to claim 11, wherein said hooking means comprise at least one eyebolt.

13. The heat exchange unit according to claim 1, wherein said tube bundle extends as a coil along a prevalent direction Z, wherein said prevalent direction Z is substantially perpendicular to a base plane on which the unit rests.

14. The heat exchange unit according to claim 13, wherein in relation to a plane perpendicular to said prevalent direction Z, said tube bundle extends at least in part along a broken line which forms a series of alternate protruding and receding angles.

15. A steam production plant comprising a heat exchange unit according to claim 1.

* * * * *